3,161,155
FOOD-DOUGH CORDS SPACING DEVICE
Giorgio Orlandi, 8 Via Grigna, Milan, Italy
Filed Feb. 2, 1962, Ser. No. 170,637
Claims priority, application Italy, Feb. 4, 1961,
1,997/61
3 Claims. (Cl. 107—4)

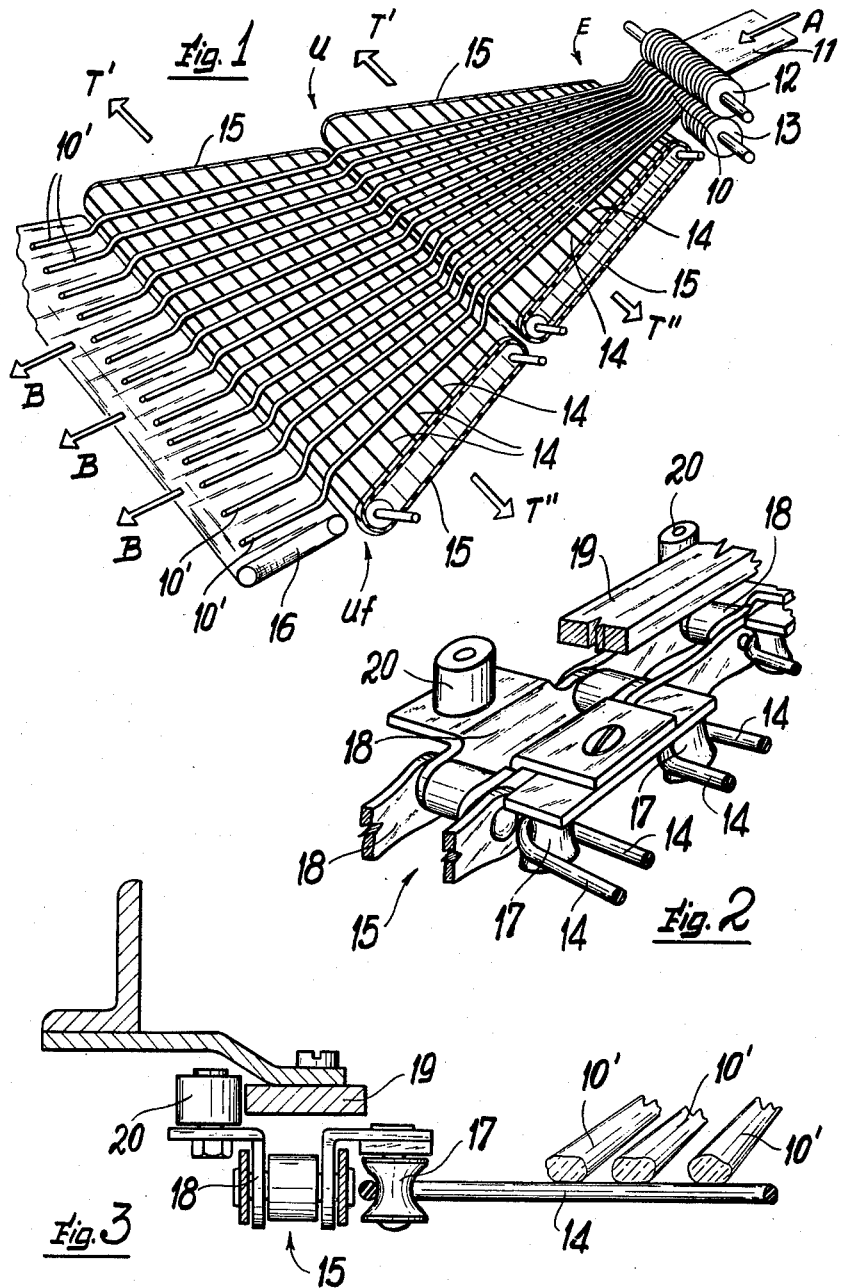

This invention generally relates to a spacing device adapted to laterally spacing continuous cords, rolls, filaments or fillets of pasty food or alimentary material while uninterruptedly fed from a source of such material to a baking oven or other plant component wherein such material is subject to baking heat treatment or otherwise processed.

More particularly, this invention is related to a new and advantageous spacing device designed to form an essential component of a plant or apparatus for thoroughly mechanized production of foodstuffs in the baking industry, and wherein foodstuffs of relatively thin cross-sectional and elongated shape are processed and produced, such as fermented and baked pastry articles of the type so-called "grissini" and like foodstuffs which may be manufactured by properly processing raw dough material produced as a continuous cord or roll or filament and then cut at evenly spaced intervals into lengths to be fed into the processing components of the baking plant or apparatus.

It is known to those skilled in the art to which this invention appertains that in full mechanized mass production of foodstuffs of the type referred to above, the said production includes a plurality of steps, comprising the dough mixing, a dough rolling and calendering step for producing a continuous strip or sheet of dough material, a step of lengthwise cutting the said strip or sheet into a plurality of correspondingly continuous thin cords or rolls or filaments, a further step wherein the said cords or rolls or filaments are evenly cut into lengths to form the materials to be baked, and then a number of further processing steps wherein the said materials are caused to be properly fermented, baked, cooled upon the passage thereof within and through heat conditioned chambers and ovens.

It is further known that the said cords or rolls or filaments, which are co-planarly and adjacently located relatively to one another, at the outlet of the lengthwise cutting device wherein the said continuous strip or sheet is cut into the said plurality of small cross-sectional cords or rolls, must be laterally spaced relatively to one another so that the lengths cut therefrom may be laid and located on conveying means, such as a belt-conveyor or, preferably a plurality of material supporting and conveying trays, in proper spaced relationship.

Such spacing of the raw materials on the supporting trays or belts or other conveying means is essential and critical in the above considered foodstuffs production, because the raw material is subject to remarkable increase in its cross-sectional size during the subsequent fermenting and baking processing steps, and because a proper full unimpeded exposure to the heat is essential for proper development of such steps.

The said spacing had been heretofore performed, in thoroughly mechanized plants, by spacing devices which are subject to many serious objections. Such known devices generally include a plurality of supporting means spacedly located along the path of said cords or rolls or filaments, designed for rollingly supporting and feeding each cord or roll or filament at a corresponding plurality of locations. Each supporting means consists of a plurality of co-axial grooved idle or driven pulleys or of a grooved idle or driven cylinder or roll, wherein the axis of said rotary means is directed transversely to the direction of the mean path of the material (i.e. the path generally defined by the center cord or roll or filament in the plurality of co-planar and adjacent filaments at the outlet of the dough strip cutting device), and wherein the axial interval between the various grooves is gradually increased in the adjacent supporting means successively engaged by said cords or rolls or filaments—whereby the several continuous materials are caused to follow paths which diverge relatively to one another while traveling along the spacing device, upon proper prior arrangement, by the operator, of each material on single defined grooves appertaining to the successive supporting means.

A principal objection to which the prior spacing means are subject consists in the fact that, as one cord or roll or filament will be broken, the leading end of the following cord would fall between two adjacent supporting means and a prompt action by the operator is therefore required for restoring the feeding of such material. During the time interval between the rupture of the material and the restoring of the feeding thereof the feeding of the processing components of the plant would be therefore not complete. Such objection is very serious in the case of complete mechanization of the plant, including foodstuff packing devices at the outlet of the plant, because a number of foodstuff containers will receive a lesser amount of material.

In addition, if a temporary overlapping of continuous materials occurs, i.e. if two or more cords or rolls or filaments should engage the same groove in any supporting means, the further feeding of said material will proceed in such irregular manner until an attendant shall rectify same. In such case, too, defective production at the outlet of the plant should be had.

Still further, the unavoidable interval between adjacent supporting means (corresponding at least to the diameter of the rotary components thereof plus a proper clearance) leads to a somewhat poor supporting of the materials at excessively spaced locations. The material of very little consistency and having poor self-supporting properties is therefore subject to frequent breaking.

Having the above and other considerations in mind, it is therefore a primary object of the present invention to provide a novel and advantageous spacing device for properly and continuously spacing elongated continuous foodstuff materials of the type considered, which is not subject to the above and other objections, and which may provide a more proper and unimpaired feeding of spaced materials, either in view of the mode of operation thereof and in view of making substantially unnecessary attendants' constant attention and prompt action if one or more cord or roll or filament should be broken or misaligned or otherwise temporarily subject to improper feeding conditions.

More particularly, it is an object of this invention to provide a new and useful spacing device as above, including conveying means continuously moving in the feeding direction of the material and adapted to support said material while moving therewith, said conveying means consisting of components of resilient material adapted for elastic elongation transversely to the said feeding direction, and including caterpillar-like circulating means causing the said components to progressively increase their dimension, transversely to the said feeding direction, while moving the material from an inlet to an outlet end portion of the device whereby the several cords or rolls or filaments, laid on differing points of the said components, are caused to diverge relatively to one another as the spacings between said points on each elastically elongating component progressively increase while said components and the materials thereon travel from inlet to outlet of the device.

Further objects and advantages of the invention reside in the arrangement of parts and components and in the details of construction of the various components of the mechanism, in their combination and in the mode of operation of the spacing device as will be hereinafter described.

In accomplishing the above mentioned and other objects of this invention, there are provided the improved features and details of construction of the essential components of the device, one preferred form of embodiment of which is illustrated in the accompanying drawing, forming an essential component of this disclosure, and wherein:

FIGURE 1 is a somewhat diagrammatical perspective view of the said preferred form of embodiment of the device of the invention;

FIGURE 2 is a fragmentary perspective view of a detail of the connection of elastically extensible components to the circulating means; and FIGURE 3 is a fragmentary cross-sectional elevational view illustrating the same detail and other particulars of the device.

Referring now to the drawing, wherein like reference numerals refer to like parts throughout the several figures, and wherein the framing and structural details have been omitted, as not forming matter claimed as new and desired to be protected hereby:

As rather diagrammatically shown in FIG. 1, the spacing device of the invention is designed to receive, at its inlet portion at E, a plurality of co-planar rolls (the term "roll," as herein made use of, being designed to refer to any elongated continuous cord-like or filament-like dough material either as this description proceeds and in the appended claims) of dough material of the type considered, the said rolls, such as indicated at 10, being substantially adjacent to one another in the said plurality, as being produced by longitudinally cutting a strip 11 of dough material. Such cutting is performed by means of conventional cutting means, such as a pair of counter-rotating rotary cutters 12 and 13, for example.

According to current knowledge, the spacing device, in particular as a component of fully mechanized plants of the type considered in the baking industry, is designed to feed at its outlet, such as at Uf, a corresponding plurality of rolls which are spaced relatively to one another, as indicated at 10'.

In FIG. 1, the direction at which the said strip 10 is fed into the cutting mechanism 12, 13 is indicated at A, and therefore the said plurality of rolls 10 is fed into and laid upon the means of the spacing device, at its inlet at E, in same direction A. The arrows B at the left end portion of the drawing indicate the parallel direction at which the said spaced rolls such as at 10' are fed from the device at the outlet thereof. The mean direction of travel of the said rolls may be therefore defined such as A–B.

While in the said FIG. 1 relatively few rolls of dough material have been illustrated, for sake of simplicity, it is obvious that a far greater number of rolls will be fed and processed in co-planar relationship in the device.

According to the essential character of this invention, the improved spacing device includes pluralities of strings 14 of elastically elongatable material, such as a rubbery material, preferably, parallel to one another, arranged in evenly spaced relationship and transversally to the said mean direction A–B of travel of the said rolls along and through the device. The strings are secured to at their end portions and stretched between circulating means 15 arranged in pairs at both side portions of the device and arranged to circulate in vertical planes diverging uniformily in respect with the said mean direction of travel A–B.

At the outlet at Uf of the device, each roll as at 10' is then transferred and laid on a suitable conventionally constructed conveying means, such as a conveyor 16, for example, for further feeding same to conventionally constructed and operated cutting devices (not shown) designed to crosswisedly cut said rolls into lengths to be further fed into the other components of the plants, such as a fermenting chamber, a baking oven, and the like, for processing the material into the desired foodstuffs. In the transfer of said rolls such as at 10' on the said conveyor 16, said rolls are caused to acquire the parallelism thereof relatively to one another in the said direction B.

The said circulating means 15 are preferably constructed and circulatingly supported as transmission chains arranged to circulate about conventionally constructed and driven sprocket gears, arranged and supported for rotation in said diverging planes. The upper runs of said chains, therefore, are caused to follow diverging paths and such sprockets are driven to impart to said upper runs a movement in direction concurrent with the said mean direction of travel A–B.

As a consequence of the above described combination and arrangement of the components of the device, the said elastic strings 14 are therefore progressively elongated, in a direction transversal to the said direction A–B, as their end portions follow the said chains 15 along the said upper runs thereof. Assuming that as an elastic string is stretched, i.e. is caused to became longer, any point thereof is caused to proportionally move away from any adjacent point in the length of such string, the various rolls laid on different points of any string 14 are therefore caused to laterally move away from the adjacent rolls as said rolls travel from inlet E to outlet Uf of the device, proportionally with the further progressive stretching of said strings 14 whose end portions, secured to said chains, are caused to relatively move away in opposite directions as indicated at T'–T", cross-wise of said direction travel A–B, while moving in the said direction A–B as carried along the upper runs of chains 15.

From what has been stated above it will be readily understood that the above described components 14 of the device act either as continuous conveying means for the said rolls and as diverging or spacing means for same rolls while supported on supporting means traveling therewith along the device. The above described device, therefore, is not subject to the discussed objections typical of prior spacing device, because even if one or more rolls will break off, either in the device or as being laid thereon, the leading end of the roll will be also carried on said components 14 towards and off the outlet of the device, without interruption of feeding. One length of the material fed in the plant's material processing units would be therefore spoiled. Likewise, if a strictly temporary overlapping of rolls occurs, such as at the outlet of the cutting device 12, 13, the following portions of the overlapping rolls would not follow a common path but they would be restored in their proper diverted paths.

In actual operation of the device, therefore, continuous attendance thereof has proved to be unnecessary, as the device provides to correct any faulty feeding of rolls thereon and any consequence of rupture of said rolls.

The device of FIG. 1 has been shown as including two rolls conveying and spacing units or subassemblies, in series in the direction A–B, where the said rolls are conveyed and spaced at given intervals at the outlet at U of the first unit and then transferred on the components of the second unit for further conveying and spacing of same, the desired final spacing being attained at the outlet at Uf of the said second unit. Such feature is preferably embodied in devices designed to process fairly or very wide strips 11 of dough material, from which a large number or rolls are longitudinally cut, for properly reducing the stresses in the rubbery material of which the said elastically extensible components 14 are made.

As a consequence of the said feature, the elongation of the said elastic strings 14 is far smaller than the increment of the width of the plurality of rolls from the entrance thereof at E in the device and the exit thereof at Uf. In fact, the strings 14 appertaining to the first operating unit are stretched as required for traveling from E to U only, and the strings of second unit are subject to elongation only as required for traveling from U to Uf. The said feature might be further improved by providing more than two units arranged in series along direction A–B for successive conveying and spacing of the rolls.

Some details of construction of the device are shown in FIGS. 2 and 3. The said strings 14 may be embodied by annular rubber rings having opposite end portions straddled about rollers 17 idly supported by braces of links 18 of the said chains 15. The runs of said chains are obviously urged, by the said stretched strings, in directions opposite to directions indicated at T' and T'' in FIG. 1. According to an ancillary feature of the invention, there are provided guide means, such as rails 19, properly secured to the framing of the apparatus (not shown), on which rollers 20, supported for idle rotation on said links 18 of the chains 15, abut and are displaced outwardly in a direction coincident with the direction of the stretching force of the said strings.

It is to be evident that the present invention includes various advantageous features, and it will be understood too that each of the new features described and any combination thereof may also find useful application in other types of devices differing from the one described.

While the invention has been heretofore described and shown but in one form of embodiment thereof, it is intended that the invention is not limited to the very details shown, and that said details should not be taken as restrictive of the invention, as it is obvious that various modifications in design may be resorted to by those skilled in the art to which this invention appertains, without departing from the spirit and scope of the invention, as defined in and by the appended claims.

Without further analysis, the foregoing will so fully reveal the gist of this invention that others can, by applying current knowledge, readily adapt it for various applications in dough materials spacing devices of the type considered, without omitting features that, from the standpoint of prior art, fairly constitute characteristics of the invention and, therefore, such adaptations should and are intended to be comprehended within the range of equivalents thereof.

Having thus described the invention, what is claimed as new and desired to have protected by Letters Patent is:

1. Strip conveyor apparatus comprising, in combination,
   forming means for forming sheeted dough into closely adjacent strips;
   transversely resiliently extensible moving means for receiving the strips formed by said forming means; and
   driving means for moving said moving means to convey said strips from said forming means to an output, said strips being spaced from each other transversely to the direction of movement of said moving means, said transversely resiliently extensible moving means comprising a plurality of sections each comprising a plurality of resiliently extensible cord-like elements spaced from each other in the direction of movement of said means and extending in substantially parallel relation to each other transversely to the direction of movement of said moving means, the resiliently extensible cord-like elements of each of said sections being stretched transversely to the direction of movement of said moving means to increasing lengths as their distance from said forming means increases.

2. Strip conveyor apparatus comprising, in combination,
   forming means for forming sheeted dough into closely adjacent strips;
   transversely resiliently extensible moving means for receiving the strips formed by said forming means; and
   driving means for moving said moving means to convey said strips from said forming means to an output, said strips being spaced from each other transversely to the direction of movement of said moving means, said transversely resiliently extensible moving means comprising a plurality of sections each comprising a plurality of resiliently extensible cord-like elements spaced from each other substantially equidistantly in the direction of movement of said moving means and extending in substantially parallel relation to each other transversely to the direction of movement of said moving means, the resiliently extensible cord-like elements of each of said sections being stretched transversely to the direction of movement of said moving means to increasing lengths as their distance from said forming means increases.

3. Strip conveyor apparatus comprising, in combination,
   forming means for forming sheeted dough into closely adjacent strips;
   transversely resiliently extensible moving means for receiving the strips formed by said forming means; and
   driving means for moving said moving means to convey said strips from said forming means to an output, said strips being spaced from each other transversely to the direction of movement of said moving means, said transversely resiliently extensible moving means comprising a plurality of sections each comprising a plurality of resiliently extensible cord-like rubber elements spaced from each other substantially equidistantly in the direction of movement of said moving means and extending in substantially parallel relation to each other transversely to the direction of movement of said moving means, the resiliently extensible cord-like elements of each of said sections being stretched transversely to the direction of movement of said moving means to increasing lengths as their distance from said forming means increases.

References Cited in the file of this patent

UNITED STATES PATENTS 2,545,667    Malnati _____ Mar. 20, 1951